Patented Mar. 20, 1951

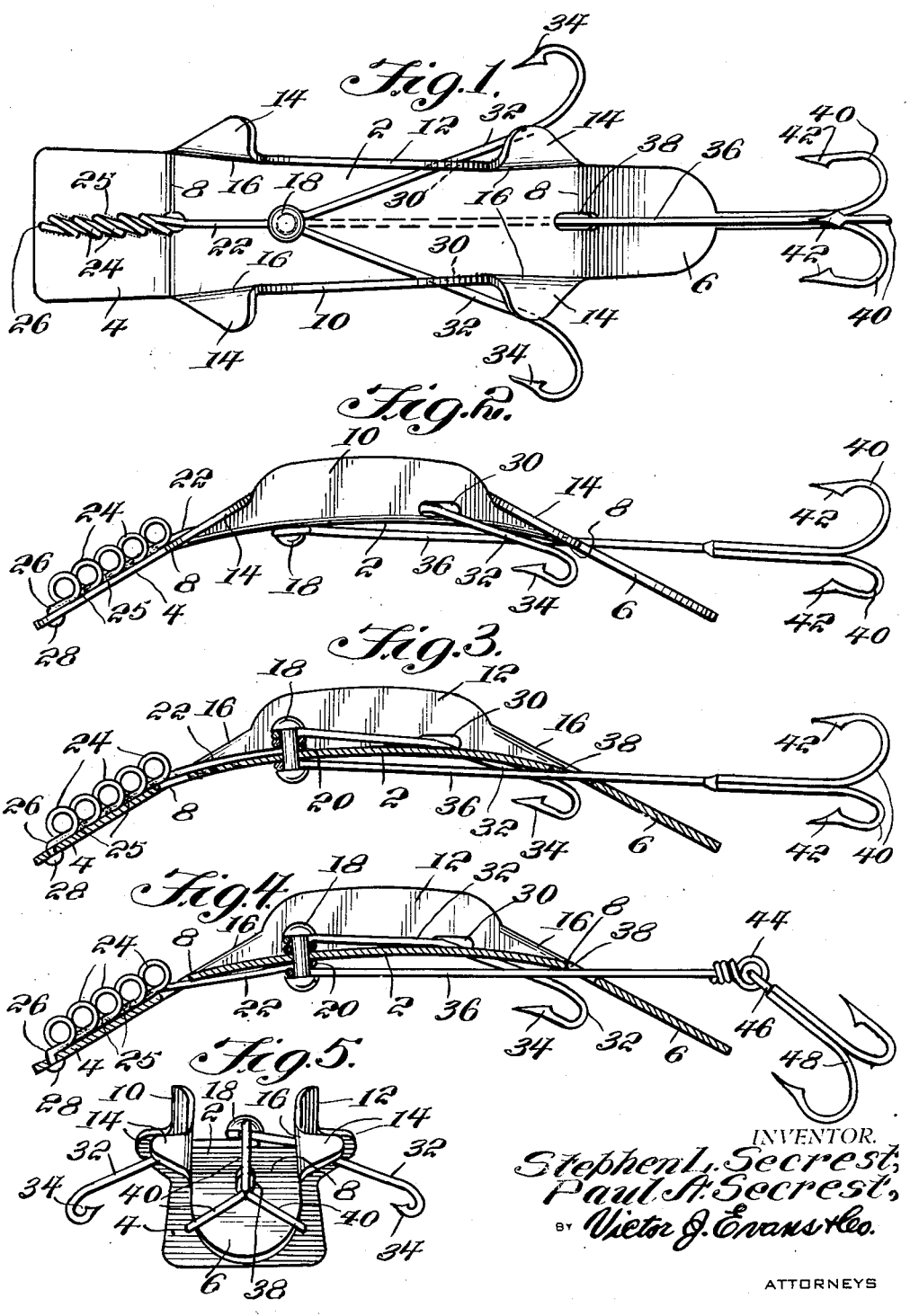

2,545,797

UNITED STATES PATENT OFFICE 2,545,797

FISHING LURE

Stephen L. Secrest and Paul A. Secrest, Lorain, Ohio

Application March 1, 1948, Serial No. 12,288

1 Claim. (Cl. 43—42.5)

Our present invention relates to an improved fishing lure of the type which in various sizes may be used in casting or trolling and when employed in such fishing techniques will offer an attractive appearance to game fish and will increase the chances of luring and hooking such fish.

Generally the lure of our invention consists in a curved metal sheet of any suitable non-rusting material, the fore and aft portions being slightly angular to the body, and the edge walls having fins or planes bent outwardly and lying in the same plane as the fore and aft portions respectively. The usual barbed hooks are provided and also means for attaching the lure to a line.

In the accompanying drawings we have illustrated one complete example of the physical embodiment of our invention according to the best mode we have thus far devised, but it will be understood that various changes and alterations may be made in the exemplified structure within the scope of the appended claim.

In the drawings:

Fig. 1 is a top plan view of the lure of our invention.

Fig. 2 is a side elevational view.

Fig. 3 is a longitudinal sectional view.

Fig. 4 is a similar view of a modified form.

Fig. 5 is an end elevational view of the lure.

Referring now to the drawings wherein we have illustrated the present preferred embodiment of our invention, we employ a sheet of metal formed into a body 2 curving downwardly from the center to the ends of the body and having fore and aft extensions 4 and 6 respectively which are bent slightly at 8 to form an angular junction.

The integral side walls 10 and 12 each having fore and aft fins or planes 14 so bent at 16 as to lie in a plane identical to the planes of the fore and aft extensions.

A central rivet 18 receives the looped end 20 of the line attaching bar 22 which has a multiplicity of eyes 24 for the line, not shown, and the bar is secured to the extension as by welding at 25. The end of the bar is bent at 26 and secured at 28 to the extension 4.

Elongated openings 30 in the side walls permit the positionings of hooks 32 secured to the rivet 18 and the barbed hooks 34 extend angularly and laterally of the lure.

A central bar 36 extending rearwardly of the rivet and secured thereto passes through an opening 38 in the body 2 and extension 6, and beyond the extension we rigidly attach a trio of hooks 40 having barbs 42.

In the modified form of Fig. 4 the bar 36 may terminate in an eye 44 to which the eye 46 of hooks 48 may be pivotally secured.

With the above described construction the lure of highly polished metal will twist, turn and snap in a lifelike manner either in casting or trolling and will prove an attraction to game fish.

Having thus fully described our invention, what we claim as new and desire to secure by Letters Patent is:

A fishing lure comprising a curved body of sheet metal having fore and aft extensions slightly angular to the curve of the body, vertical side walls on the body, and lateral fins on the side walls in pairs, each pair being in the same plane as the adjoining extension.

STEPHEN L. SECREST.
PAUL A. SECREST.

REFERENCES CITED

The following references are of record in the file of this patent:

UNITED STATES PATENTS

| Number | Name | Date |
|---|---|---|
| 1,873,682 | Van Ness | Aug. 23, 1932 |
| 2,088,775 | Davenport | Aug. 2, 1937 |
| 2,168,476 | Hartung | Aug. 8, 1939 |
| 2,197,209 | Eppinger | Apr. 16, 1940 |
| 2,254,981 | Sisco | Sept. 2, 1941 |